United States Patent
Dayrit et al.

(10) Patent No.: US 6,599,639 B2
(45) Date of Patent: Jul. 29, 2003

(54) COEXTRUDED, RETORTABLE MULTILAYER FILM

(75) Inventors: Richard M. Dayrit, Simpsonville, SC (US); Steven T. Calvert, Simpsonville, SC (US); Stephen J. Schwarz, Inman, SC (US); Daniel L. McKamy, Simpsonville, SC (US); Brian Rivers, Simpsonville, SC (US); Bobby Ayers, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/809,987

(22) Filed: Mar. 16, 2001

(65) Prior Publication Data

US 2003/0017352 A1 Jan. 23, 2003

(51) Int. Cl.$^7$ .................. B32B 27/34; B32B 27/30; B32B 27/32
(52) U.S. Cl. ................ 428/475.8; 428/476.1; 428/476.3; 428/476.9; 428/516; 428/520; 428/910
(58) Field of Search ............ 428/475.8, 476.1, 428/476.3, 476.9, 516, 520, 910, 34.8, 34.9, 35.2, 35.4, 36.6, 36.7

(56) References Cited

U.S. PATENT DOCUMENTS

| | | | |
|---|---|---|---|
| 4,355,721 A | 10/1982 | Knott, II et al. | 206/524.2 |
| 4,464,443 A | 8/1984 | Farrell et al. | 428/688 |
| 4,640,852 A | 2/1987 | Ossian | 428/35 |
| 4,746,562 A | 5/1988 | Fant | 428/213 |
| 4,755,419 A | 7/1988 | Shah | 428/220 |
| 4,919,984 A | 4/1990 | Maruhashi et al. | 428/36.4 |
| 4,928,474 A | 5/1990 | Schirmer | 53/425 |
| 4,929,482 A | 5/1990 | Moritani et al. | 428/36.4 |
| 4,997,691 A | 3/1991 | Parkinson | 428/35.7 |
| 4,999,229 A | 3/1991 | Moritani et al. | 428/36.6 |
| 5,491,009 A | 2/1996 | Bekele | 428/35.7 |
| 5,547,765 A | 8/1996 | Degrassi et al. | 428/474.7 |
| 5,707,750 A | 1/1998 | Degrassi et al. | 428/475.8 |
| 5,716,715 A | 2/1998 | Degrassi et al. | 428/475.8 |
| 5,723,088 A | 3/1998 | Murschall et al. | 264/469 |
| 5,725,917 A | 3/1998 | Parks | 428/34.2 |
| 5,725,962 A | 3/1998 | Bader et al. | 428/515 |
| 5,932,305 A | 8/1999 | Akazawa | 428/35.7 |
| 6,221,470 B1 | 4/2001 | Ciocca et al. | 428/218 |

FOREIGN PATENT DOCUMENTS

| | | |
|---|---|---|
| AU | 9863688 | 11/1998 |
| JP | 10152596 A | 6/1998 |
| WO | WO 95/33621 | 12/1995 |

OTHER PUBLICATIONS

Technical Report New EVAL® Resin with Improved Retortability (with e-mail cover letter), Total 4 pages, Robert A. Armstrong, dated Nov. 17, 1999.
"Developing Retortable EVOH", Packaging Innovation, vol. 3, No. 4, Jan. 1999, p 6.
Capran Oxyshield® Films (Retortable), Allied Signal, Apr., 1997 (pp. 1–7).

*Primary Examiner*—D. S. Nakarani
(74) *Attorney, Agent, or Firm*—Mark B. Quatt

(57) ABSTRACT

A coextruded, retortable film includes a core layer having an ethylene/vinyl alcohol copolymer; two intermediate layers including a polyamide; two adhesive layers including a polymeric adhesive; and two outer layers including low density polyethylene, medium density polyethylene, high density polyethylene, ethylene/alpha olefin copolymer, propylene homopolymer, and/or propylene/alpha olefin copolymer. A method of packaging a product using this film, and a package, are disclosed. A retortable film includes a first layer including low density polyethylene, medium density polyethylene, high density polyethylene, ethylene/alpha olefin copolymer, propylene homopolymer, and/or propylene/alpha olefin copolymer; a second layer including a polymeric adhesive; a third layer including an ethylene/vinyl alcohol copolymer; a fourth layer including a polymeric adhesive; a fifth layer including a polyamide; a sixth layer including a polymeric adhesive; and a seventh layer including low density polyethylene, medium density polyethylene, high density polyethylene, ethylene/alpha olefin copolymer, propylene homopolymer, and/or propylene/alpha olefin copolymer.

10 Claims, 1 Drawing Sheet

COEXTRUDED, RETORTABLE MULTILAYER FILM

FIELD OF THE INVENTION

The present invention relates to coextruded, retortable thermoplastic film.

BACKGROUND OF THE INVENTION

Pouches made from films or laminates, including polymers such as polyethylene or polypropylene, have found use in a variety of applications. For example, such pouches are used to hold low viscosity fluids (e.g., juice and soda), high viscosity fluids (e.g., condiments and sauces), fluid/solid mixtures (e.g., soups), gels, powders, and pulverulent materials. The benefit of such pouches lies, at least in part, in the fact that such pouches are easy to store prior to filling and produce very little waste when discarded. The pouches can be formed into a variety of sizes and shapes.

Pouches can be assembled from films, laminates, or web materials using vertical form-fill-seal (VFFS) machines. Such machines receive the film, laminate, or web material and manipulate the material to form the desired shape. For example, one or more films, laminates, and/or web materials can be folded and arranged to produce the desired shape. Once formed, the edges of the pouch are sealed and the pouch filled. Typically, the film, laminate, or web material has at least one heat seal layer or adhesive surface which enables the edges to be sealed by the application of heat. During the sealing process, a portion of at least one edge of the pouch is left unsealed until after the pouch is filled. The pouch is filled through the unsealed portion and the unsealed portion is then sealed. Alternatively, the pouch can be filled and the unsealed portion simultaneously closed in order to provide a sealed pouch with minimal headspace. The VFFS process is known to those of skill in the art, and described for example in U.S. Pat. No. 4, 589,247 (Tsuruta et al), incorporated herein by reference. A flowable product is introduced through a central, vertical fill tube to a formed tubular film having been sealed transversely at its lower end, and longitudinally. The pouch is then completed by sealing the upper end of the tubular segment, and severing the pouch from the tubular film above it.

Ethylene/vinyl alcohol copolymer (EVOH) has been used in high oxygen barrier VFFS applications to provide a package with a relatively long shelf life. A problem arises where the filled pouch is subjected to retort conditions. In such instances, film structures containing conventional EVOH undergo structural, cosmetic, and functional degradation.

The structural degradation is expressed as delamination, during the retort cycle, of the film layer containing the EVOH, from the adjacent layers of the film structure. This structural failure can lead to package failure if substantial enough.

The cosmetic degradation is expressed as film whitening during elevated temperatures, especially at high relative humidity. The aesthetic appearance of filled pouches is often important to the food processor as well as the final customer.

The functional degradation is expressed as a degradation in the oxygen barrier function of the EVOH, or put differently, an undesirable increase in oxygen transmission rate. This degradation is caused by the drop in barrier performance of EVOH at all relative humidities since the EVOH is actually damaged during retort. Voids will form in the EVOH during retorting and the barrier properties drop off significantly at all moisture levels. In most film structures containing EVOH, it is the EVOH that primarily controls oxygen transmission rate of the overall film. Therefore, a failure in the barrier properties of the EVOH translates into a failure of the barrier properties of the overall film. As a result, targeted shelf life is not achieved, and rapid product degradation can occur.

Because of these deficiencies, food products that require retorting are typically still packaged in rigid containers such as cans. These bulky containers create environmental issues about waste disposal. It would be beneficial to provide a film which can be filled and sealed on a form-fill-seal machine, and used in retort applications, without significant undesirable degradation during the retort cycle.

The invention is directed to a coextruded, retortable film for packaging of products such as liquid foods (soups, sauces, taco meat, etc.), with or without particulates, that require retort. The coextruded aspect of the invention is an important feature, because it would be beneficial to produce a coextruded film for use in retort VFFS applications. Laminating separate films or substrates together is time-consuming and costly.

SUMMARY OF THE INVENTION

In a first aspect, a multilayer, coextruded, retortable film comprises a core layer comprising an ethylene/vinyl alcohol copolymer; two intermediate layers, disposed on opposite surfaces of the core layer, comprising a polyamide; two adhesive layers, each disposed on a surface of the respective intermediate layer, comprising a polymeric adhesive; and two outer layers, each comprising a material selected from the group consisting of low density polyethylene, medium density polyethylene, high density polyethylene, ethylene/alpha olefin copolymer, propylene homopolymer, and propylene/alpha olefin copolymer.

In a second aspect, a method of packaging a food product comprises providing a multilayer coextruded retortable film, the film comprising a core layer comprising an ethylene/vinyl alcohol copolymer; two intermediate layers, disposed on opposite surfaces of the core layer, comprising a polyamide; two adhesive layers, each disposed on a surface of the respective intermediate layer, comprising a polymeric adhesive; and two outer layers, each comprising a material selected from the group consisting of low density polyethylene, medium density polyethylene, high density polyethylene, ethylene/alpha olefin copolymer, propylene homopolymer, and propylene/alpha olefin copolymer; forming the film into a tube in a vertical/form/fill/seal process; filling the tube with a food product; closing the tube to form a sealed pouch containing the food product; and subjecting the sealed pouch containing the food product to retort conditions.

In a third aspect, a package comprises a flowable retorted food product; and a pouch containing the food product, the pouch made from a multilayer coextruded retortable film comprising a core layer comprising an ethylene/vinyl alcohol copolymer; two intermediate layers, disposed on opposite surfaces of the core layer, comprising a polyamide; two adhesive layers, each disposed on a surface of the respective intermediate layer, comprising a polymeric adhesive; and two outer layers, each comprising a material selected from the group consisting of low density polyethylene, medium density polyethylene, high density polyethylene, ethylene/alpha olefin copolymer, propylene homopolymer, and propylene/alpha olefin copolymer.

In a fourth aspect, a multilayer, coextruded, retortable film comprises a first layer comprising a material selected from the group consisting of low density polyethylene, medium density polyethylene, high density polyethylene, ethylene/alpha olefin copolymer, propylene homopolymer, and propylene/alpha olefin copolymer; a second layer comprising a polymeric adhesive; a third layer comprising an ethylene/vinyl alcohol copolymer; a fourth layer comprising a polymeric adhesive; a fifth layer comprising a polyamide; a sixth layer comprising a polymeric adhesive; and a seventh layer comprising a material selected from the group consisting of low density polyethylene, medium density polyethylene, high density polyethylene, ethylene/alpha olefin copolymer, propylene homopolymer, and propylene/alpha olefin copolymer.

In a fifth aspect, a method of packaging a food product comprises providing a multilayer coextruded retortable film, the film comprising a first layer comprising a material selected from the group consisting of low density polyethylene, medium density polyethylene, high density polyethylene, ethylene/alpha olefin copolymer, propylene homopolymer, and propylene/alpha olefin copolymer; a second layer comprising a polymeric adhesive; a third layer comprising an ethylene/vinyl alcohol copolymer; a fourth layer comprising a polymeric adhesive; a fifth layer comprising a polyamide; a sixth layer comprising a polymeric adhesive; and a seventh layer comprising a material selected from the group consisting of low density polyethylene, medium density polyethylene, high density polyethylene, ethylene/alpha olefin copolymer, propylene homopolymer, and propylene/alpha olefin copolymer; forming the film into a tube in a vertical/form/fill/seal process; filling the tube with a food product; closing the tube to form a sealed pouch containing the food product; and subjecting the sealed pouch containing the food product to retort conditions.

In a sixth aspect, a package comprises a flowable retorted food product; and a pouch containing the food product, the pouch made from a multilayer coextruded retortable film comprising a first layer comprising a material selected from the group consisting of low density polyethylene, medium density polyethylene, high density polyethylene, ethylene/alpha olefin copolymer, propylene homopolymer, and propylene/alpha olefin copolymer; a second layer comprising a polymeric adhesive; a third layer comprising an ethylene/vinyl alcohol copolymer; a fourth layer comprising a polymeric adhesive; a fifth layer comprising a polyamide; a sixth layer comprising a polymeric adhesive; and a seventh layer comprising a material selected from the group consisting of low density polyethylene, medium density polyethylene, high density polyethylene, ethylene/alpha olefin copolymer, propylene homopolymer, and propylene/alpha olefin copolymer.

Definitions

"Core layer" herein refers to the central layer of a film with an odd number of layers, or one of the two central layers of a film with an even number of layers.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

Films of the present invention are not solid state oriented, and exhibit a free shrink (ASTM D 2732-83) of less than 8%, preferably less than 5%, at 200° in each of the longitudinal and transverse directions. These films are therefore non-heat shrinkable. Film of the present invention can exhibit a free shrink of less than 5% in the longitudinal direction, and less than 5% in the transverse direction, at 180° F.

"Low density polyethylene" (LDPE) herein refers to a polyethylene having a density of between 0.915 and 0.925 grams per cubic centimeter.

"Medium density polyethylene" (MDPE) herein refers to a polyethylene having a density of between 0.926 and 0.939 grams per cubic centimeter.

"High density polyethylene" (HDPE) herein refers to a polyethylene having a density of between 0.94 and 0.965 grams per cubic centimeter.

"Intermediate" herein refers to a layer of a multi-layer film which is between an outer layer and an internal layer of the film.

"Internal layer" herein refers to a layer which is not an outer or surface layer, and is typically a central or core layer of a film.

"Linear low density polyethylene" (LLDPE) herein refers to polyethylene having a density between 0.917 and 0.925 grams per cubic centimeter, made by Zeigler/Natta catalysis.

"Linear medium density polyethylene" (LMDPE) herein refers to polyethylene having a density between 0.926 grams per cubic centimeter and 0.939 grams per cubic centimeter, made by Zeigler/Natta catalysis.

"Outer layer" herein refers to what is typically an outermost, usually surface layer or skin layer of a multi-layer film, although additional layers, coatings, and/or films can be adhered to it.

"Polymer" herein refers to homopolymer, copolymer, terpolymer, etc. "Copolymer" herein includes copolymer, terpolymer, etc.

"Retortable" herein refers to a film that can be formed into a pouch, filled with an oxygen sensitive product, and sealed, and subjected to sterilizing conditions of high temperature (between 250° F. and 300° F.), for a period of time of between 10 minutes and 60 minutes, in the presence of water, steam, or pressurized steam, without delamination of the EVOH layer from the adjacent layers of the film, or voiding of the EVOH and subsequent oxygen barrier loss. Typical retort conditions are 250° F. for 30 minutes.

"Solid state oriented" herein refers to films obtained by coextrusion of the resins of the different layers to obtain a primary thick sheet or tube that is quickly cooled to a solid state, then reheated to an orientation temperature, then uniaxially or biaxially stretched using e.g. a trapped bubble or tenter frame process, and then rapidly cooled.

All compositional percentages used herein are presented on a "by weight" basis, unless designated otherwise.

BRIEF DESCRIPTION OF THE DRAWINGS

A detailed description of preferred embodiments of the invention follows, with reference to the attached drawings, wherein.

DETAILED DESCRIPTION OF THE INVENTION

Figure 1:
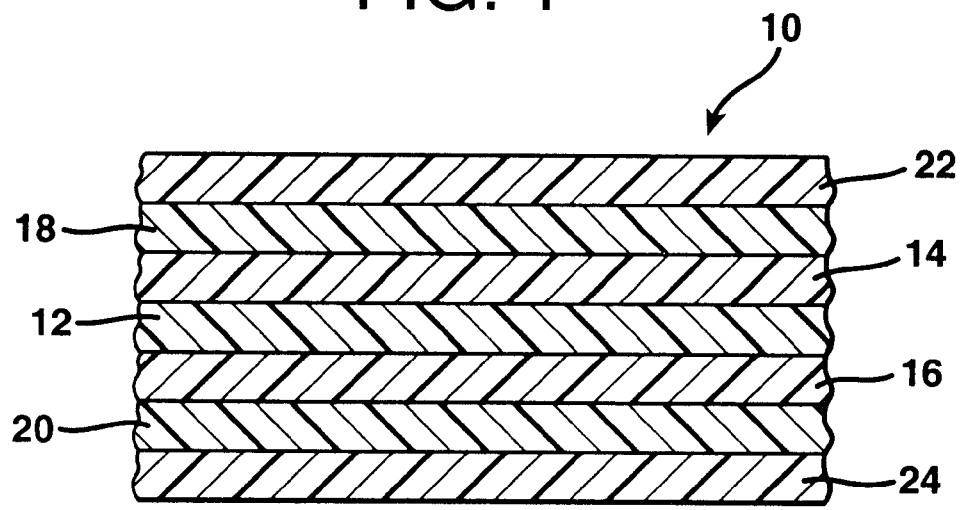
FIG. 1 is a cross-sectional view of a seven layer film.

Referring to FIG. 1, which is a cross-sectional view of a seven layered embodiment of the present invention, a film 10 comprising a core layer 12, two intermediate layers 14 and 16, two polymeric adhesive layers 18 and 20, and two outer layers 22 and 24. Outer layers 22 and 24 are preferably surface layers.

Core layer 12 comprises a retortable grade ethylene/vinyl alcohol copolymer, i.e. an EVOH that will not delaminate from either adjacent layer after the film has been exposed to retort conditions. These conditions are between 250° F. and 300° F., for a period of time of between 10 minutes and 60 minutes, in the presence of water, steam, or pressurized steam. Typical retort conditions are 250° F. for 30 minutes. Preferred EVOH resins include XEP-334™ from Evalca, and SG372B™ from Soarus. The EVOH of the core layer 12 can optionally be blended with small amounts of additives such as slip or antiblock agents, pigments, processing aids and the like. The EVOH can be blended with nylon or other resins to improve processability. Blends of EVOH with up to 50%, by weight of the blend, of nylon can be used in the core layer 12. Any of the types of nylon disclosed herein for intermediate layers 14 and 16 can be used as the blending material for core layer 12.

Intermediate layers 14 and 16 each comprise polyamide. Preferred polyamides include nylon 6, nylon 9, nylon 11, nylon 12, nylon 66, nylon 69, nylon 610, nylon 612, nylon 6/12, nylon 6/66, nylon 6/69, nylon 66/610, nylon 66/6, nylon 6T, and nylon 12T,; amorphous nylons such as MXD6 (a copolymer of m-xylylenediamine and adipic acid), nylon 6I/6T, etc.; and blends of any of the above, in any suitable proportions of each blend component.

Polymeric adhesive layers (sometimes referred to herein as "tie" layers) 18 and 20 each comprise a polymeric adhesive, and more preferably an olefin polymer or copolymer having an anhydride functionality grafted thereon and/or copolymerized therewith and/or blended therewith. Preferred polymeric adhesives are anhydride grafted ethylene/1-butene copolymer, anhydride grafted ethylene/1-hexene copolymer, anhydride grafted ethylene/1-octene copolymer, anhydride grafted polypropylene, anhydride grafted high density polyethylene, and anhydride grafted ethylene/vinyl acetate copolymer.

Outer layers 22 and 24 each comprise a polymer selected from the group consisting of low density polyethylene, medium density polyethylene, high density polyethylene, ethylene/alpha-olefin copolymer, propylene homopolymer, and propylene/alpha-olefin copolymer, and blends of any of the above, in any suitable proportions of each blend component. Preferred materials, depending on the desired end-use application, are medium density polyethylene, high density polyethylene, linear low density polyethylene (linear ethylene/$C_4$–$C_{10}$ alpha-olefin copolymer), metallocene-catalyzed ethylene/$C_4$–$C_{10}$ alpha-olefin copolymer, polypropylene, and propylene/ethylene copolymer.

Figure 2:
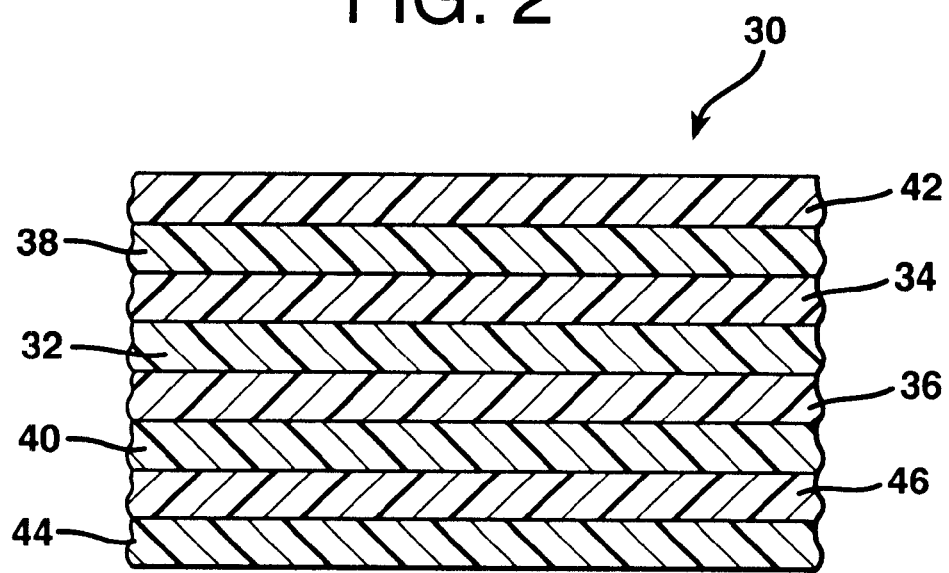
FIG. 2 is a cross-sectional view of an eight layer film.

The two outer layers are preferably each disposed on a surface of a respective adhesive layer. Referring to FIG. 2, in an alternative embodiment, a film is like that just described and shown in FIG. 1, except that an additional layer 46 is included. Thus, the choice of materials for layers 32, 34 and 36, 38 and 40, and 42 and 44 is the same as the materials disclosed above for layers, 12, 14 and 16, 18 and 20, and 22 and 24 respectively. One function of layer 46 is to provide a functional barrier in the event that regulatory requirements require control of migration of materials from the film to a contained food product. Olefinic polymers and copolymers are preferred for layer 46, and more preferred are medium density polyethylene and high density polyethylene, and blends of any of the above, in any suitable proportions of each blend component.

Table 1 identifies the materials used in the examples.

TABLE 1

| Material Code | Tradename or Designation | Source |
|---|---|---|
| A1 | ALATHON ™ M-5040 | Equistar |
| A2 | AMPACET ™ 10850 | Ampacet |
| A3 | TYMOR ™ 1203 | Rohm & Haas |
| A4 | ULTRAMID ™ B4 | BASF |
| A5 | XEP-334 ™ | Evalca |
| A6 | FORTIFLEX ™ T60-500-119 | Solvay |
| A7 | DOWLEX ™ 2037 | Dow |

A1 is a high density polyethylene with a density of 0.950 grams/cc, and a melt index of 4.0.

A2 is a blend of about 90% linear low density polyethylene with about 10% of a combination of diatomaceous silica and erucamide wax.

A3 is an anhydride grafted linear low density polyethylene with a flow rate of 1.6, and a density of 0.910 grams/cc.

A4 is a polycaprolactam (nylon 6).

A5 is a retort-grade ethylene/vinyl alcohol copolymer.

A6 is a high density polyethylene with a density of 0.961 grams/cc, and a melt index of 6.2.

A7 is a linear medium density polyethylene with a density of 0.935 grams/cc, a melt index of 2.5, and a 1-octene comonomer content of 2.5% by weight of the copolymer.

EXAMPLE 1

A multilayer film was coextruded by conventional methods as a tube from an annular die, by a downward cast method, quenched, irradiated by electron beam irradiation at a dosage of between 20 and 35 kiloGrays, and slit to produce a layflat roll stock film. The film had the structure of Table 1:

TABLE 1

| 95% A1 + 5% A2 | A3 | A4 | A5 | A4 | A3 | 95% A1 + 5% A2 |
|---|---|---|---|---|---|---|
| 25 | 7.5 | 12.5 | 10 | 12.5 | 7.5 | 25 |

The film had a total thickness of between 3.5 and 5.5 mils. The values underneath each film layer of Table 1 indicate the percent of the total film gauge attributable to that particular layer. For example, 10% of the thickness of the film was the A5 resin layer.

Additional Examples

Table 2 shows additional examples in accordance with the invention.

TABLE 2

| Example | Layer 1 | Layer 2 | Layer 3 | Layer 4 | Layer 5 | Layer 6 | Layer 7 | Layer 8 |
|---|---|---|---|---|---|---|---|---|
| Ex.2 | LLDPE + LMDPE | ahLLDPE | nylon | EVOH | nylon | ahLLDPE | MDPE | LLDPE + LMDPE |
| Ex.3 | LLDPE + LMDPE | ahLLDPE | nylon | EVOH | nylon | ahLLDPE | | LLDPE + HDPE |
| Ex.4 | LLDPE + HDPE | ahLLDPE | nylon | EVOH | nylon | ahLLDPE | HDPE | LLDPE + HDPE |
| Ex.5 | HDPE | ahLLDPE | nylon | EVOH | nylon | ahLLDPE | | HDPE |
| Ex.6 | PP + LMDPE | AhPP | nylon | EVOH | nylon | ahPP | | PP + LMDPE |
| Ex.7 | PP + HDPE | AhPP | nylon | EVOH | nylon | ahPP | | PP + HDPE |
| Ex.8 | PP | AhPP | nylon | EVOH | nylon | ahPP | | PP |
| Ex.9 | EPC + LMDPE | AhPP | nylon | EVOH | nylon | ahPP | | EPC + LMDPE |
| Ex.10 | EPC + HDPE | AhPP | nylon | EVOH | nylon | ahPP | | EPC + HDPE |
| Ex.11 | EPC | AhPP | nylon | EVOH | nylon | ahPP | | EPC |

Notes to Table 2:
1. Except for examples 2 and 4, total gauge and individual layer gauges are as disclosed for Example 1. Examples 2 and 4 have the same total gauge as in Example 1.
2. Blends indicated in Table 2 are 50% of each resin, by weight of the blend, unless otherwise noted, e.g. Ex. 2 has outer layers each having a blend of 50% LLDPE and 50% LMDPE, each percent by weight of the overall blend. Each of the indicated blend components can be present in the range of between 1% and 99% by weight of the blend.
3. "PP" refers to propylene homopolymer.
"LMDPE" refers to linear medium density polyethylene.
"ahLLDPE" refers to anhydride grafted linear low density polyethylene.
"ahPP" refers to anhydride grafted polypropylene.
4. "nylon" can be one or more of nylon 6, nylon 66, nylon 6/66, nylon 6/69, and nylon 6/12.

In two alternative embodiments of the invention, retortable film structures are as follows:

EXAMPLE 12

| Layer 1 | Layer 2 | Layer 3 | Layer 4 | Layer 5 | Layer 6 | Layer 7 |
|---|---|---|---|---|---|---|
| Sealant | Tie | EVOH | Tie | Nylon | Tie | Sealant |

EXAMPLE 13

| Layer 1 | Layer 2 | Layer 3 | Layer 4 | Layer 5 | Layer 6 | Layer 7 | Layer 8 |
|---|---|---|---|---|---|---|---|
| Sealant | Tie | EVOH | Tie | Nylon | Tie | HDPE | Sealant |

For both examples 12 and 13, the choice of resins, layer gauge, processing and crosslinking conditions and options, and the like, are as disclosed above.

Thus, examples 12 and 13 are somewhat like the previous examples, but form asymmetric rather than symmetric films. Each of these two examples has only one nylon layer as disclosed in the examples.

Layer 7 of example 13 is an optional layer comparable in function to layer 46 of FIG. 2.

The inventors have found that certain sealants work better than others when used as outer layers in connection with the present invention.

It was found that 100% high density polyethylene, when used as a sealant, imparted undesirable brittleness to the film, especially after film was made into a pouch, filled with a fluid, and exposed to the retort cycle.

It was also found that 100% linear medium density polyethylene, when used as a sealant, resulted in wrinkles in the film material when a pouch made from this material had been exposed to the retort process. The film undesirably welded to itself as well as to adjacent pouches. Sticking can also occur on trays used to hold the filled pouches in a pressurized steam chamber for retorting. It is believed that the composite Vicat softening point of the sealant layers may play a role in the selection of optimal sealants for the retortable film of the invention. By "composite Vicat softening point" is meant the relative percents of each polymeric blend component of the sealant layers, multiplied by the Vicat softening point of each component. For example, one preferred blend for the outer layers of a film of the invention is a blend of 80% LMDPE (DOWLEX™2037) and 20% HDPE (FORTIFLEX™ T60-500-119). With Vicat softening points of 242° F. and 264° F. respectively for these materials, a composite Vicat softening point for each outer layer is 246.4° F., calculated as follows:

$$0.8(242)+0.2(264)=246.4$$

Preferred sealant compositions have a composite Vicat softening point of between 245° F. and 260° F., more preferably between 250° F. and 255° F.

Preferred sealant compositions for each of the outer layers range between 20% and 80% LMDPE, and between 80% and 20% HDPE. Other preferred blends are between 30% and 70% LMDPE, and between 70% and 30% HDPE, such as between 40% and 60% LMDPE, and between 60% and 40% HDPE, such as 50% LMDPE and 50% HDPE. If an additive such as a slip/antiblock masterbatch is added to the composition of each outer layer, then typically about 4% to 5%, by weight of the layer, of an LLDPE or other polymeric carrier will be present. The weight % and Vicat softening point of such a material will also be taken into account in computing the Vicat softening point.

The above discussion of composite Vicat softening point is directed at ethylene polymers and copolymers. A list of typical materials useful in the outer layers of the film of the present invention appears in Table 3.

| Resin Type | Trademark | Vendor | Vicat Softening Point (° F.) |
|---|---|---|---|
| high density polyethylene | FORTIFLEX ™ T60-500 | Solvay | 264 |
| LLDPE (medium density >0.93) | DOWLEX ™ 2037 | Dow | 242 |
| LLDPE (density <0.93) | DOWLEX ™ 2045 | Dow | 223 |
| hexene copolymer (metallocene) | EXCEED ™ 363C32 | Exxon | — |
| ethylene-vinyl acetate copolymer | ELVAX ™ 3120 | Dupont | 183 |
| polyolefin plastomer | AFFINITY ™ PL1840 | Dow | 207 |
| ultra low density polyethylene | ATTANE ™ 4701 | Dow | 201 |
| polyethylene copolymer | ELITE ™ 5400 | Dow | 216 |
| low density polyethylene | LDPE ™ 4005 | Dow | 190 |
| ethylene butyl acrylate copolymer | EBAC ™ 1802 | Chevron | 138 |
| ethylene methyl acrylate | OPTEMA ™ TC-020 | Exxon | 215 |

Also useful in the sealant layers are propylene polymers and copolymers, such as:

| polypropylene random copolymer | MOPLEN ™ EP2 S 29B | Montell | 284 |
|---|---|---|---|
| polypropylene homopolymer | PP 4553 F2 ™ | ExxonMobil | 313 |
| impact polypropylene copolymer | PP 7023 P1 ™ | ExxonMobil | 304 |

Suitable blends for use as outer layers in films of in the present invention thus can include:

100% polypropylene random copolymer
100% polypropylene homopolymer
100% impact polypropylene copolymer
95% polypropylene random copolymer+5% A2
95% polypropylene homopolymer+5% A2
95% impact polypropylene copolymer+5% A2
80% polypropylene homopolymer+20% plastomer Most retortable films are not lap sealable because they are asymmetric in construction, and the dissimilar outer layers are not normally heat sealable to each other when the film is formed into a tube in a vertical/form/fill/seal format. These prior art films also typically have a relatively high moisture vapor transmission rate (MVTR) on one side of the package, and a relatively low moisture vapor transmission rate (MVTR) on the opposite side of the package. The high MVTR is typically provided by nylon. The opposite side of the package will typically have a material, such as polypropylene, with a relatively low MVTR.

Lap sealability provides typically better abuse resistance than fin sealed pouches.

The present invention offers in some embodiments symmetric film structures that can be beneficially lap sealed.

Films of the present invention can be made by coextrusion, and are preferably made by tubular cast coextrusion, such as that shown in U.S. Pat. No. 4,551,380 [Schoenberg], herein incorporated by reference in its entirety. Films can also be made by flat cast and hot blown processes well known in the art.

Films of the present invention can have any total thickness desired, so long as the film provides the desired properties for the particular packaging operation in which the film is used. Final film thicknesses can vary, depending on process, end use application, etc. Typical thicknesses range from 0.3 to 20 mils, preferably 1 to 15 mils, more preferably (for VFFS applications) 3 to 10 mils, such as 3 to 7 mils.

The polymeric components used to fabricate film according to the present invention can also contain appropriate amounts of other additives normally included in or blended with such compositions. These include slip agents, antioxidants, fillers, dyes, pigments, radiation stabilizers, antistatic agents, elastomers, and other additives known to those of skill in the art of packaging films.

The multilayer film of the present invention is preferably crosslinked, by chemical means or, preferably, by irradiation such as by electron beam irradiation at a dosage of between 10 and 200, more preferably between 15 and 150, more preferably between 20 and 150, and most preferably between 20 and 100 kiloGray. Although the invention does not have to be irradiated, in a preferred embodiment, irradiation can be used to improve retortability of the film. Crosslinking improves the abuse resistance and grease resistance of the film, and the resulting package.

It is to be understood that variations of the present invention can be made without departing from the scope of the invention, which is not limited to the specific embodiments and examples disclosed herein.

What is claimed is:

1. A multilayer, coextruded, retortable film comprising:
    a) a core layer comprising a retortable grade ethylene/vinyl alcohol copolymer;
    b) two intermediate layers, disposed on opposite surfaces of the core layer, comprising a polyamide;
    c) two adhesive layers, each disposed on a surface of the respective intermediate layer, comprising a polymeric adhesive; and
    d) two outer layers, each comprising a material selected from the group consisting of low density polyethylene, medium density polyethylene, high density polyethylene, ethylene/alpha olefin copolymer, propylene homopolymer, and propylene/alpha olefin copolymer;

wherein the film exhibits a free shrink of less than 5% in the longitudinal direction, and less than 5% in the transverse direction, at 180° F.

2. The film of claim 1 wherein a functional barrier layer is disposed between one of the outer layers, and one of the adhesive layers.

3. The film of claim 1 wherein the polyamide is selected from the group consisting of nylon 6, nylon 9, nylon 11, nylon 12, nylon 66, nylon 69, nylon 610, nylon 612, nylon 6/12, nylon 6/66, nylon 6/69, nylon 66/610, nylon 66/6, nylon 6T, nylon 12T, and amorphous nylon.

4. The film of claim 1 wherein the polymeric adhesive layers each comprise a polymeric adhesive selected from the group consisting of anhydride grafted ethylene/1-butene copolymer, anhydride grafted ethylene/1-hexene copolymer, anhydride grafted ethylene/1octene copolymer, anhydride grafted polypropylene, anhydride grafted high density polyethylene, and anhydride grafted ethylene/vinyl acetate copolymer.

5. The film of claim 1 wherein the two outer layers each have a composite Vicat softening point of between 245° F. and 260° F.

6. A multilayer, coextruded, retortable film comprising:
   a) a first layer comprising a material selected from the group consisting of low density polyethylene, medium density polyethylene, high density polyethylene, ethylene/alpha olefin copolymer, propylene homopolymer, and propylene/alpha olefin copolymer;
   b) a second layer comprising a polymeric adhesive;
   c) a third layer comprising a retortable grade ethylene/vinyl alcohol copolymer;
   d) a fourth layer comprising a polymeric adhesive;
   e) a fifth layer comprising a polyamide;
   f) a sixth layer comprising a polymeric adhesive; and
   g) a seventh layer comprising a material selected from the group consisting of low density polyethylene, medium density polyethylene, high density polyethylene, ethylene/alpha olefin copolymer, propylene homopolymer, and propylene/alpha olefin copolymer;

wherein the film exhibits a free shrink of less than 5% in the longitudinal direction, and less than 5% in the transverse direction, at 180° F.

7. The film of claim 6 wherein a functional barrier layer is disposed between the sixth and seventh layers.

8. The film of claim 6 wherein the polyamide is selected from the group consisting of nylon 6, nylon 9, nylon 11, nylon 12, nylon 66, nylon 69, nylon 610, nylon 612, nylon 6/12, nylon 6/66, nylon 6/69, nylon 66/610, nylon 66/6, nylon 6T, nylon 12T, and amorphous nylon.

9. The film of claim 6 wherein the polymeric adhesive layers each comprise a polymeric adhesive selected from the group consisting of anhydride grafted ethylene/1-butene copolymer, anhydride grafted ethylene/1-hexene copolymer, anhydride grafted ethylene/1octene copolymer, anhydride grafted polypropylene, anhydride grafted high density polyethylene, and anhydride grafted ethylene/vinyl acetate copolymer.

10. The film of claim 6 wherein the first and seventh layers each have a composite Vicat softening point of between 245° F. and 260° F.

* * * * *